United States Patent
Sudanagunta et al.

(10) Patent No.: US 10,789,624 B2
(45) Date of Patent: Sep. 29, 2020

(54) SYSTEMS AND METHODS FOR PROVIDING MEDIA CONTENT OVER AN ELECTRONIC NETWORK

(71) Applicant: Oath Inc., Dulles, VA (US)

(72) Inventors: Srinivasan Sudanagunta, Seattle, WA (US); Karen Nelson Howe, Sammamish, WA (US); Jennifer Lynn Kolar, Seattle, WA (US)

(73) Assignee: Oath Inc., Dulles, VA (US)

( * ) Notice: Subject to any disclaimer, the term of this patent is extended or adjusted under 35 U.S.C. 154(b) by 304 days.

(21) Appl. No.: 15/890,328

(22) Filed: Feb. 6, 2018

(65) Prior Publication Data

US 2018/0181659 A1    Jun. 28, 2018

Related U.S. Application Data

(63) Continuation of application No. 11/173,799, filed on Jul. 1, 2005, now Pat. No. 9,910,920.

(60) Provisional application No. 60/585,563, filed on Jul. 2, 2004.

(51) Int. Cl.
*G06Q 30/02* (2012.01)

(52) U.S. Cl.
CPC ......... *G06Q 30/0276* (2013.01); *G06Q 30/02* (2013.01); *G06Q 30/0241* (2013.01); *G06Q 30/0251* (2013.01); *G06Q 30/0256* (2013.01)

(58) Field of Classification Search
CPC ........... G06Q 30/0241; G06Q 30/0251; G06Q 30/0256
USPC ...................................................... 705/1–28
See application file for complete search history.

(56) References Cited

U.S. PATENT DOCUMENTS

| | | | |
|---|---|---|---|
| 5,600,364 A | 2/1997 | Hendricks et al. |
| 5,616,876 A | 4/1997 | Cluts |
| 5,633,683 A | 5/1997 | Rosengren et al. |
| 5,634,064 A | 5/1997 | Warnock et al. |
| 5,680,323 A | 10/1997 | Barnard |
| 5,721,827 A | 2/1998 | Logan et al. |

(Continued)

FOREIGN PATENT DOCUMENTS

| | | |
|---|---|---|
| CN | 1387656 | 12/2002 |
| CN | 1471669 | 1/2004 |

(Continued)

OTHER PUBLICATIONS

"Digital Insertion of Advertising Into a Digital Stream (DID)", by E. McGrath. SeaChange Internationl, USA. International Broadcasting Convention, Sep. 12-16, 1997. Conference Publication No. 447. pp. 258-261. (Year: 1997).*

(Continued)

*Primary Examiner* — William A Brandenburg
(74) *Attorney, Agent, or Firm* — Bookoff McAndrews, PLLC (57) ABSTRACT

A facility for processing a search query is described. The facility identifies one or more items that satisfy the query, at least one of which is a media sequence. For each identified media sequence, the facility identifies an advertising message based upon the contents of the query. In response to the query, the facility returns a search result that indicates the identified items. When one of the identified media sequences is selected in the search result, the selected media sequence is provided in conjunction with the advertising message identified for it.

20 Claims, 4 Drawing Sheets

(56) References Cited

U.S. PATENT DOCUMENTS

| | | |
|---|---|---|
| 5,737,619 A | 4/1998 | Judson |
| 5,991,374 A | 11/1999 | Hazenfield |
| 5,996,015 A * | 11/1999 | Day .................... H04L 29/06 348/E7.071 |
| 6,009,410 A | 12/1999 | LeMole et al. |
| 6,018,619 A | 1/2000 | Allard et al. |
| 6,018,768 A | 1/2000 | Ullman et al. |
| 6,069,669 A | 5/2000 | Park et al. |
| 6,118,450 A | 9/2000 | Proehl et al. |
| 6,121,963 A | 9/2000 | Ange |
| 6,211,871 B1 | 4/2001 | Himmel et al. |
| 6,223,178 B1 | 4/2001 | Himmel et al. |
| 6,251,016 B1 | 6/2001 | Tsuda et al. |
| 6,262,724 B1 | 7/2001 | Crow et al. |
| 6,267,676 B1 | 7/2001 | Nagaoka |
| 6,389,467 B1 | 5/2002 | Eyal |
| 6,446,083 B1 | 9/2002 | Leight et al. |
| 6,486,891 B1 | 11/2002 | Rice |
| 6,505,169 B1 * | 1/2003 | Bhagavath ............. G06Q 30/02 705/14.66 |
| 6,785,688 B2 | 8/2004 | Abajian et al. |
| 6,839,903 B1 | 1/2005 | Shintani et al. |
| 6,842,761 B2 | 1/2005 | Diamond et al. |
| 6,877,002 B2 | 4/2005 | Prince |
| 6,911,998 B2 | 6/2005 | Wiseman |
| 6,941,300 B2 | 9/2005 | Jensen-Grey |
| 6,990,630 B2 | 1/2006 | Landsman et al. |
| 7,000,242 B1 | 2/2006 | Haber |
| 7,181,444 B2 | 2/2007 | Porter et al. |
| 7,222,163 B1 | 5/2007 | Girouard et al. |
| 8,122,236 B2 | 2/2012 | Hayward |
| 9,104,669 B1 * | 8/2015 | Des Jardins ............ G06F 16/40 |
| 2001/0044795 A1 | 11/2001 | Cohen et al. |
| 2001/0049824 A1 | 12/2001 | Baker et al. |
| 2001/0054001 A1 | 12/2001 | Robinson |
| 2002/0013897 A1 * | 1/2002 | McTernan ......... H04N 21/2343 713/153 |
| 2002/0032906 A1 | 3/2002 | Grossman |
| 2002/0053078 A1 | 5/2002 | Holtz et al. |
| 2002/0065947 A1 | 5/2002 | Wishoff et al. |
| 2002/0069105 A1 | 6/2002 | do Rosario Botelho et al. |
| 2002/0078441 A1 | 6/2002 | Drake et al. |
| 2002/0082901 A1 | 6/2002 | Dunning et al. |
| 2002/0083469 A1 | 6/2002 | Jeannin et al. |
| 2002/0152267 A1 * | 10/2002 | Lennon ................. G06F 16/40 709/203 |
| 2003/0014310 A1 | 1/2003 | Jung et al. |
| 2003/0120541 A1 * | 6/2003 | Siann ................ G06Q 30/0267 705/14.47 |
| 2004/0015398 A1 * | 1/2004 | Hayward ............. G06F 40/103 705/14.49 |
| 2004/0015703 A1 | 1/2004 | Madison et al. |
| 2004/0030681 A1 | 2/2004 | Shannon et al. |
| 2004/0030683 A1 | 2/2004 | Evans et al. |
| 2004/0045040 A1 | 3/2004 | Hayward |
| 2004/0051812 A1 | 3/2004 | Hayward |
| 2004/0059632 A1 | 3/2004 | Kang et al. |
| 2004/0064500 A1 | 4/2004 | Kolar et al. |
| 2004/0088328 A1 | 5/2004 | Cook et al. |
| 2005/0027821 A1 | 2/2005 | Alexander et al. |
| 2008/0082413 A1 * | 4/2008 | Madhavan ......... G06Q 30/0277 705/14.53 |
| 2008/0133701 A1 * | 6/2008 | Kazmi ................... G06F 21/10 709/217 |
| 2009/0024649 A1 * | 1/2009 | Broder ................. G06F 16/367 |
| 2009/0024718 A1 * | 1/2009 | Anagnostopoulos .. G06Q 30/02 709/218 |
| 2014/0236708 A1 * | 8/2014 | Wolff ................. G06O 30/0273 705/14.41 |

FOREIGN PATENT DOCUMENTS

| | | |
|---|---|---|
| EP | 0867003 | 9/1998 |
| JP | H11-112562 | 4/1999 |
| JP | 2000-059326 | 2/2000 |
| JP | 2000-137667 | 5/2000 |
| JP | 2000-515692 | 11/2000 |
| KR | 2000-0037022 | 7/2000 |
| KR | 2000-0050151 | 8/2000 |
| WO | WO 97/22201 | 6/1997 |
| WO | WO 00/43914 | 7/2000 |
| WO | WO 00/48057 | 8/2000 |
| WO | WO 02/056578 | 7/2002 |
| WO | WO 02/057934 | 7/2002 |

OTHER PUBLICATIONS

"Rapidly Expanding Graphics Environment," *NIKKEI Byte* (Jun. 1, 1995), No. 139, pp. 244-256 (2 pages).

"Section 2 Platform," *NIKKEI Byte* (Feb. 1, 1994), No. 122, pp. 122-134 (2 pages).

T. Akanuma, "Power-up of Internet Browser," *Touch PC* (Oct. 24, 2000), vol. 5, No. 10, pp. 50-57.

"Adding Windows Media to Web Pages" (Dec. 31, 2000), retrieved from http://msdn.microsoft.com/en-us/library/ms983653.aspx on Jan. 31, 2018.

European Office Action dated Jan. 31, 2007, for European Patent Application No. 01 989 347.8 (5 pages).

European Supplemental Search Report dated Mar. 27, 2006, for European Patent Application No. 01 989 347.8 (3 pages).

European Office Action dated Oct. 24, 2006, for European Patent Application No. 01 989 326.2 (4 pages).

European Supplemental Search Report dated Aug. 17, 2006, for European Patent Application No. 01 989 326.2 (3 pages).

International Search Report and Written Opinion dated Apr. 1, 2003, for International Patent Application No. PCT/US01/51228 (5 pages).

International Search Report and Written Opinion dated Nov. 15, 2002, for International Patent Application No. PCT/US01/51373 (5 pages).

Official Action for Japanese Patent Application No. 2002-557111, dated Sep. 7, 2007 (2 pages).

Official Action for Japanese Patent Application No. 2002-557111, dated Feb. 16, 2007 (3 pages).

Official Action for Japanese Patent Application No. 2002-549056, dated Jan. 9, 2008 (3 pages).

Office Action for Korean Application No. 10-2003-7005382, dated Nov. 30, 2007 (9 pages).

Non-Final Office Action dated Jun. 21, 2007, for U.S. Appl. No. 10/415,210 (11 pages).

Non-Final Office Action dated Nov. 4, 2008, for U.S. Appl. No. 10/415,216 (17 pages).

International Search Report and Written Opinion dated Jul. 28, 2008, for International Patent Application No. PCT/US05/23331 (5 pages).

European Supplemental Search Report dated Nov. 2, 2009, for European Patent Application No. 05 763 898.3 (6 pages).

European Office Action dated Dec. 13, 2012, for European Patent Application No. 05 763 898.3 (6 pages).

European Supplemental Search Report dated Jun. 27, 2012, for European Patent Application No. 12 003 558.9 (5 pages).

European Office Action dated Jul. 26, 2013, for European Patent Application No. 12 003 558.9 (5 pages).

Chinese Office Action dated Apr. 13, 2010, for Chinese Patent Application No. 200580029532.7 (English translation, 9 pages).

Chinese Office Action dated Aug. 20, 2015, for Chinese Patent Application No. 200580029532.7 (16 pages).

Summons to Oral Proceedings dated Apr. 10, 2017, for European Patent Application No. 12 003 558.9 (8 pages).

Summons to Oral Proceedings dated Oct. 12, 2016, for European Patent Application No. 05 763 898.3 (6 pages).

Chinese Office Action dated Sep. 8, 2011, for Chinese Patent Application No. 200580029532.7 (English translation, 9 pages).

Chinese Office Action dated Jan. 6, 2012, for Chinese Patent Application No. 200580029532.7 (English translation, 11 pages).

Chinese Decision on Reexam dated Apr. 23, 2013, for Chinese Patent Application No. 200580029532.7 (6 pages).

(56) References Cited

OTHER PUBLICATIONS

Chinese Decision to Grant dated Mar. 3, 2016, for Chinese Patent Application No. 200580029532.7 (English translation, 2 pages).
Canadian Office Action dated Mar. 22, 2011, for Canadian Patent Application No. 2,572,513 (4 pages).
Canadian Office Action dated Nov. 27, 2012, for Canadian Patent Application No. 2,572,513 (4 pages).
Canadian Notice of Allowance dated Dec. 17, 2013, for Canadian Patent Application No. 2,572,513 (1 page).
Australian Notice of Acceptance dated Jan. 4, 2012, for Australian Patent Application No. 2005270155 (3 pages).
Australian Examination Report dated Mar. 23, 2010, for Australian Patent Application No. 2005270155 (4 pages).
Australian Examination Report dated Nov. 1, 2011, for Australian Patent Application No. 2005270155 (3 pages).
Australian Notice of Acceptance dated Sep. 1, 2014, for Australian Patent Application No. 2012202232 (2 pages).
Australian Examination Report dated Nov. 22, 2012, for Australian Patent Application No. 2012202232 (3 pages).
Australian Examination Report dated Dec. 9, 2013, for Australian Patent Application No. 2012202232 (4 pages).
Australian Examination Report dated May 19, 2014, for Australian Patent Application No. 2012202232 (4 pages).

\* cited by examiner

FIG. 3 advertising message information table — 300

| search terms | media type | advertiser | media address | message id |
|---|---|---|---|---|
| general | mpg | New Jersey Generals | www.mediaserve.net/njj/preseason.mpg | 3824921 |
| "General Motors" | avi | GMC | www.mediahost.com/gmc00083.avi | 9128314 |
| "General Motors" | wav | GMC | www.mediahost.com/gmc00012.wav | 9128315 |

FIG. 4

SYSTEMS AND METHODS FOR PROVIDING MEDIA CONTENT OVER AN ELECTRONIC NETWORK

CROSS-REFERENCE TO RELATED APPLICATIONS

The present application is a continuation of U.S. application Ser. No. 11/173,799, filed Jul. 1, 2005 (now allowed), and claims the benefit of priority to U.S. Provisional Application No. 60/585,563, filed Jul. 2, 2004. The above applications are hereby incorporated by reference in their entireties.

TECHNICAL FIELD

The described technology is directed to the field of electronic advertising.

BACKGROUND

Media sequences of various kinds are available to users from various sources via the World Wide Web ("the web"). As examples, a user may access an audio sequence containing a song, a lecture, or a radio program; a video sequence containing a sports contest or silent-movie scene; or an audio/video sequence containing a movie, music video, television program, or news report.

Because the cost can be high for providing the storage and bandwidth resources needed to make media sequences available via the web, some media sequence providers sell advertising to be included in media sequences accessed via the web to defray these costs. In one common conventional approach, providers of media sequences select for each primary media sequence they make available an advertising message whose subject is similar to the subject of the primary media sequence, and whose media type is the same as the primary media sequence. For example, to a primary media sequence that is an audio/video news report about a hurricane in the Bahamas, the media sequence provider may attach an audio/video advertisement for a weather information service.

While this conventional approach may result in at least modest advertising revenue, it has the disadvantage that it causes the same advertising message to be shown to every user accessing the primary media sequence. Where the users accessing a particular primary media sequence have divergent interests, such "blanket" advertising may be less productive.

Accordingly, an approach that permitted advertising messages attached to media sequences to be more specifically targeted to the users accessing the video sequences would have significant utility.

DETAILED DESCRIPTION

A software facility for selecting targeted advertising messages for deployment with media sequences ("the facility") is provided. The facility operates in connection with a multimedia search engine, such as the multimedia search engines described in U.S. patent application Ser. No. 09/878,866 filed Jun. 11, 2001; U.S. patent application Ser. No. 09/878,876 filed Jun. 11, 2001; U.S. patent application Ser. No. 09/876,941 filed Jun. 8, 2001; U.S. patent application Ser. No. 09/876,925 filed Jun. 8, 2001; U.S. patent application Ser. No. 10/432,316 filed May 21, 2003; U.S. patent application Ser. No. 10/432,258 filed May 21, 2003; U.S. patent application Ser. No. 10/432,306 filed May 21, 2003; U.S. patent application Ser. No. 10/432,388 filed May 21, 2003; U.S. patent application Ser. No. 10/415,021 filed Apr. 24, 2003; U.S. patent application Ser. No. 10/415,216 filed Apr. 24, 2003; and U.S. patent application Ser. No. 10/415,210 filed Apr. 24, 2003, each of which is hereby incorporated herein by reference in its entirety. When a user submits a query made up of search terms to a multimedia search engine, the query is used for two purposes: (1) to generate a search result containing controls such as links that can be used to download and/or render media sequences satisfying the query; and (2) to select one or more media sequence advertising messages to be deployed with the media sequences satisfying the query when downloaded and/or rendered. In various embodiments, the facility deploys the selected advertising messages in a variety of ways, including (1) inserting the advertising message into, or "attaching it to," the media sequences that satisfy the query, or (2) while a media sequence satisfying the query is being downloaded and/or rendered, displaying still image thumbnails of the selected advertising messages that the user may activate in order to view the selected advertising messages. For example, where a music video media sequence for the song Hollywood by the artist Madonna appears in the search result for the query "Madonna," the facility may insert an advertising message for Madonna's newest album into the music video or display thumbnail for such advertising message alongside the music video. On the other hand, when the music video appears in the search result for the query "Hollywood," the facility may instead deploy the music video with an advertising message for Hollywood tourist attractions. By selecting and deploying an advertising message with media sequences in some or all of the ways described above, the facility enables a media sequence provider to obtain additional revenue from presenting an advertising message likely to be relevant to the user performing the search.

Figure 1:
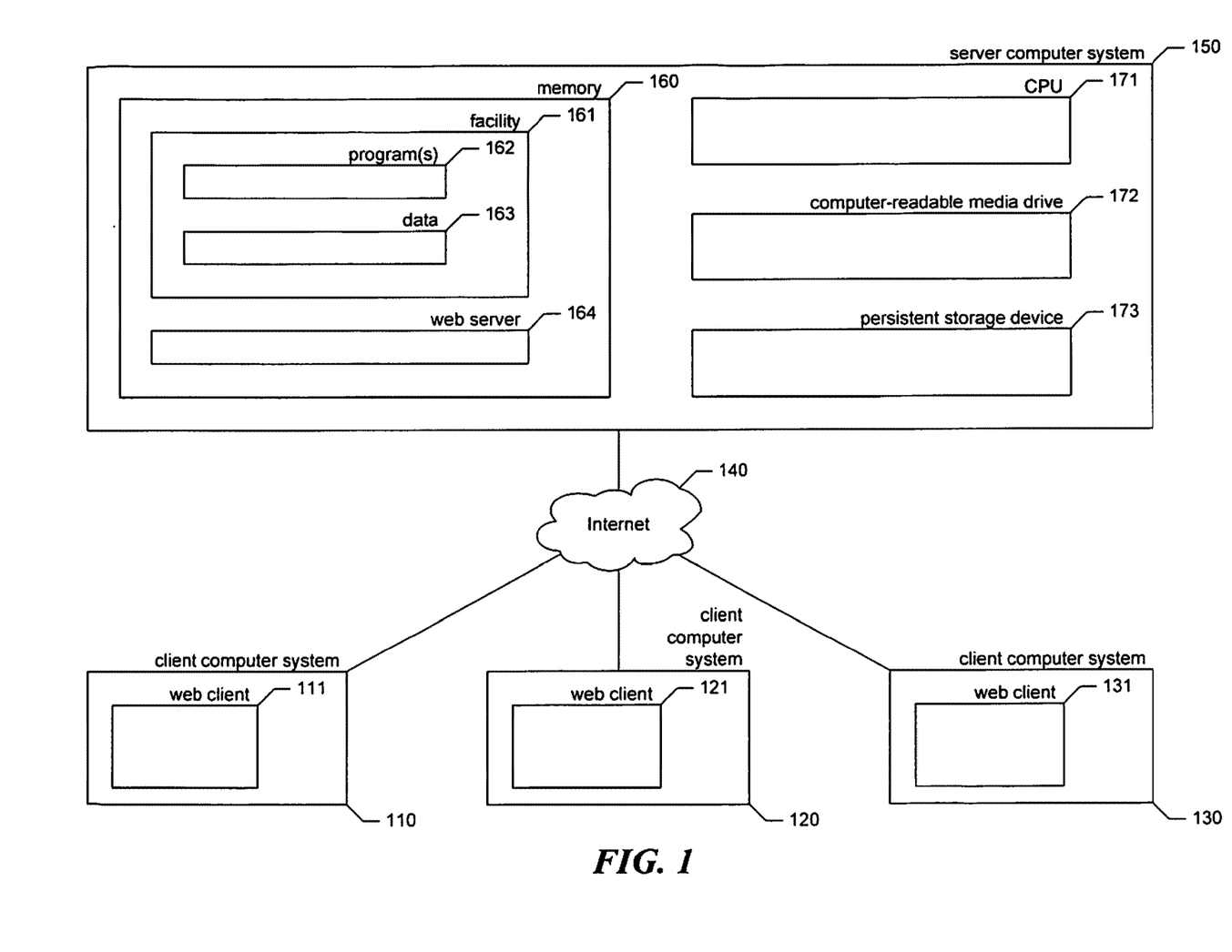
FIG. 1 is a high-level block diagram showing a typical environment in which the facility operates.

FIG. 1 is a high-level block diagram showing a typical environment in which the facility operates. The block diagram shows several client computer systems, such as client computer systems 110, 120, and 130. Each of the client computer systems has a web client computer program that a user of the client computer system can use to browse the World Wide Web, such as web clients 111, 121, and 131. Such web clients typically allow their users to submit queries to multimedia search engines, and play media sequences listed in search results produced in response to those queries. The client computer systems are connected via the Internet 140 to a server computer system 150 hosting the facility. Those skilled in the art will recognize that client computer systems could be connected to the server computer system by networks other than the Internet, however.

The server computer system 150 contains a memory 160. The memory 160 preferably contains the facility 161, comprising one or more programs 162, as well as data 163. Data 163 typically includes data relating single or multi-word search terms to advertising messages of one or more media sequence types. Such data may reflect the results of various kinds of advertising message sales techniques, such as auctions or outright purchase of particular search terms by advertisers or their representatives. The memory preferably further contains a web server computer program 164 for delivering web pages in response to requests from web clients. While items 161-164 are preferably stored in memory while being used, those skilled in the art will appreciate that these items, or portions of them, maybe be transferred between memory and a persistent storage device 172 for purposes of memory management and data integrity. The server computer system further contains one or more central processing units (CPU) 171 for executing programs, such as programs 161-164, and a computer-readable medium drive 173 for reading information or installing programs such as the facility from computer-readable media, such as a floppy disk, a CD-ROM, or a DVD.

While various embodiments of the facility are described in terms in the environment described above, those skilled in the art will appreciate that the facility may be implemented in a variety of other environments including a single, monolithic computer system, as well as various other combinations of computer systems or similar devices connected in various ways. In particular, the facility may interact with users via a wide range of portable and/or wireless user interface devices, such as cellular telephones, pagers, personal digital assistants, etc.

Figure 2:
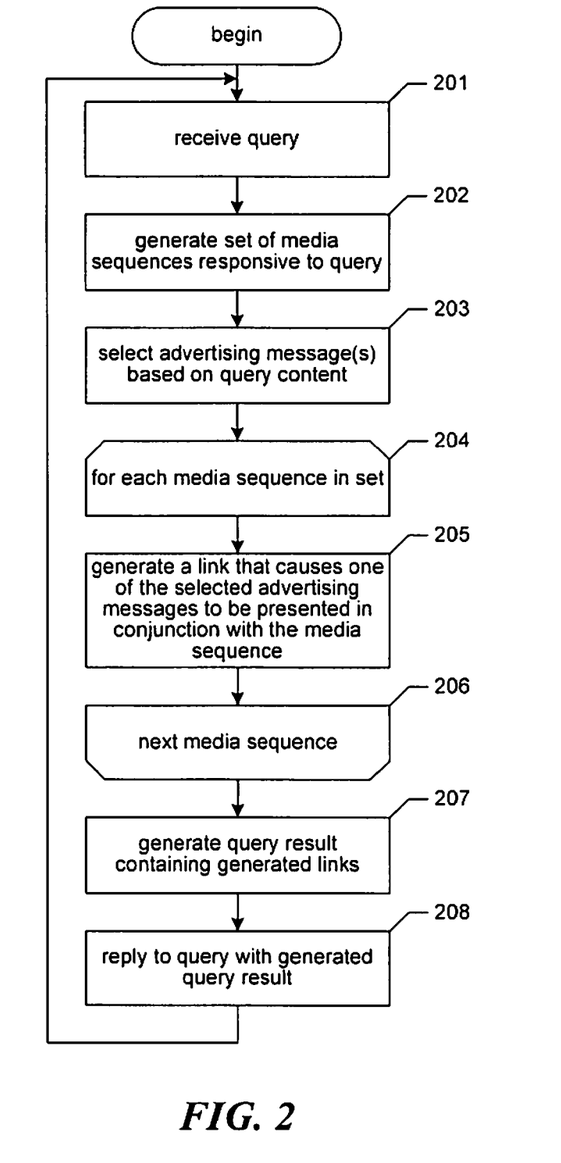
FIG. 2 is a flow diagram showing steps typically performed by the facility in order to process a query.

FIG. 2 is a flow diagram showing steps typically performed by the facility in order to process a query. In step 201, the facility receives the query. In step 202, the facility generates a set of media sequences that is responsive to the query. In some embodiments, the facility performs step 202 using multimedia search engine techniques described in one or more of the patent applications listed above. In step 203, the facility selects one or more advertising messages based upon the contents of the query. The selected advertising messages may include advertising messages of one or more media types, and/or media sequences relating to one or more different subjects associated with contents of the query.

Figure 3:
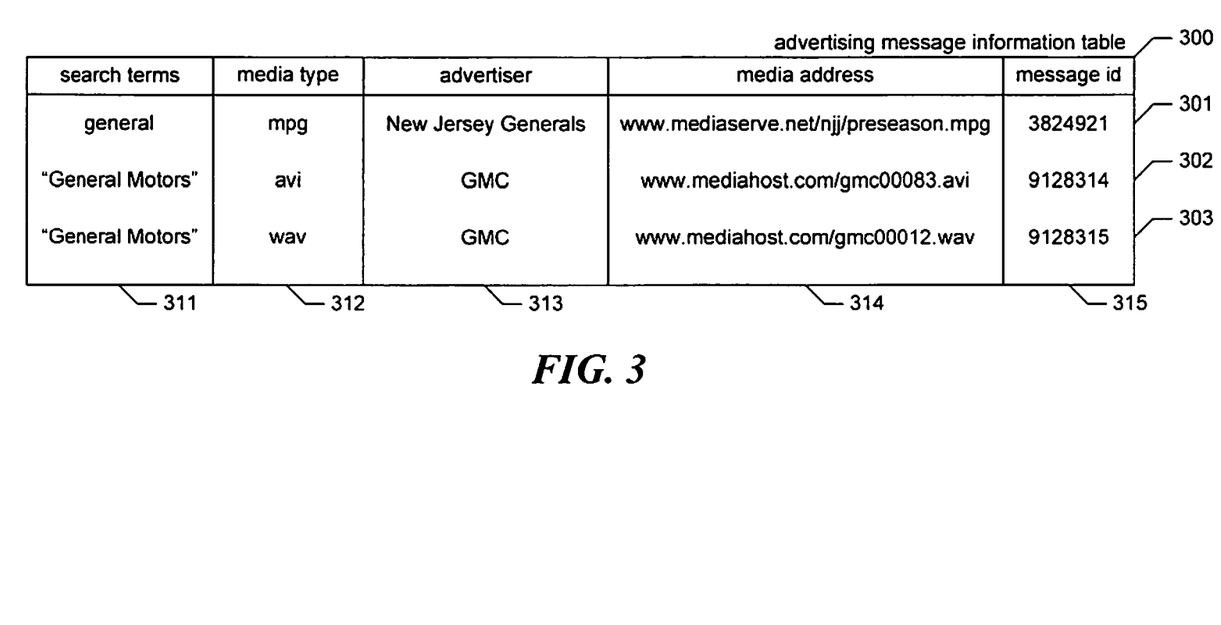
FIG. 3 is a data structure diagram showing sample contents of an advertising message information table used by the facility in some embodiments to select advertising messages based upon query contents.

FIG. 3 is a data structure diagram showing sample contents of an advertising message information table used by the facility in some embodiments to select advertising messages based upon query contents. The advertising message information table 300 is made up of rows, such as rows 301-303, each corresponding to a different combination of an advertising message with one or more search terms used to select the advertising message. Each row contains information in the following columns: a search terms column 311 containing one or more search terms associated with the advertising message; a media type column 312 indicating a media type of the advertising message; an advertiser column 313 containing identifying information for the advertiser on whose behalf the advertising message will be presented; a media address column 314 containing an address from which the advertising message media sequence may be retrieved; and a message id column 315 containing an identifier for the advertising message that may be used to maintain presentation statistics for the advertising message, bill the advertiser for presenting the advertising message, etc. For example, row 302 indicates that an avi advertising message for GMC having identifier 9128314 and available from media address www.mediahost.com/gmc0083.avi may be selected for attachment to media sequences included in a search result produced for a search query containing the search term "General Motors."

The facility typically identifies rows of the advertising message information table that in the search terms column contains search terms that match search terms in the query. In some cases, the facility further seeks to match the media type of selected advertising messages either directly to the media type of each of the principle media sequences, or to a group of media types that includes the media type of the principle media sequence, such as a group of audio/video media sequence media types, or a group of media sequence media types supported by a particular media viewer program, etc. In some embodiments, the facility selects the advertising messages associated with all rows of the advertising message information table whose search terms match the query. In some embodiments, the facility selects the advertising messages associated with the rows of the advertising message information table whose search terms most significantly match the query.

While FIG. 3 shows a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

Returning to FIG. 2, in some embodiments, in step 203, the facility employs additional information to select advertising messages that are as relevant as possible to the user. Such additional information may include profile or preference information established for the user; metadata associated with one or more of the media sequences in the set generated in step 202; information provided by the advertiser or a designee of the advertiser; instructions to manually override the advertising messages selected for particular queries, query terms, resulting media sequences, or groups of resulting media sequences, such as those issued by the advertiser using campaign management software; etc.

In steps 204-206, the facility loops through each media sequence in the set generated in step 202. In step 205, the facility generates a link that causes one of the advertising messages selected in step 203 to be presented in conjunction with the media sequence when the link is dereferenced. This advertising message is generally of a media sequence type that is either the same as, or otherwise compatible with the media sequence type of the media sequence. The advertising message may be chosen based upon information associated with the media sequence, such as metadata attributed to the media sequence. In some cases, the generated link causes more than one of the selected advertising messages to be presented in conjunction with the media sequence.

In some embodiments, the facility generates the link in step 205 in a manner that causes the selected advertising message to be attached to the media sequence. The generated link may cause the selected advertising message to be presented in various positions relative to the media sequence, such as before the media sequence, after the media sequence, during the media sequence, or throughout the media sequence or portions of the media sequence. Table 1 below shows sample contents for a link generated by the facility in step 205.

TABLE 1 http://sponsoredvideo.aol.com/play?content=www.varchive.net/sloane_speech.avi?ad=www.mediahost.com/gmc00083.avi The portion of the sample link before the first question mark directs a request to a server capable of concatenating one or more advertising messages with a media sequence. The portion of the sample link between the first and second question marks identifies the media sequence to the server, while the portion after the second question mark identifies the advertising message to the server. When the server receives this request, it retrieves both the advertising message and the media sequence, concatenates them, and serves the concatenated result to the client. In some embodiments, the facility constructs the link in such a way as to direct the request to a server for the advertising message that is capable of retrieving and concatenating the media sequence, or a server for the media sequence that is capable of retrieving and concatenating the advertising message. In some embodiments, the facility encodes the contents of the link to make it more difficult or impossible to identify the URL of the advertising message and/or the media sequence without possession of data stored on the server. For example, as shown below in Table 2, the parameters containing the URLs for the media sequence in the advertising message may be replaced with numerical or other identifiers that are mapped to the corresponding URLs on the server.

TABLE 2 http://sponsoredvideo.aol.com/play?contentid=2306022&adid=9235255

In some embodiments, the facility encrypts the media sequence and advertising message parameters such that they can be decrypted using a key stored on the server, as shown below in Table 3.

TABLE 3 http://sponsoredvideo.aol.com/play?d098sdgds4o8sgdog84h4e4kjh

In some embodiments, the link is constructed to point to a custom media metafile, such as an .asx file, hosted by the facility. Sample contents for such an .asx file corresponding to the example shown in Table 1 are shown below in Table 4.

TABLE 4 ref1=www.mediahost.com/gmc00083.avi
ref2=www.varchive.net/sloane_speech.avi

In some embodiments, in step 205, the facility further causes visual information identifying a provider of the media sequence to be displayed, such as between the display of the media sequence and the display of the advertising message.

Figure 4:
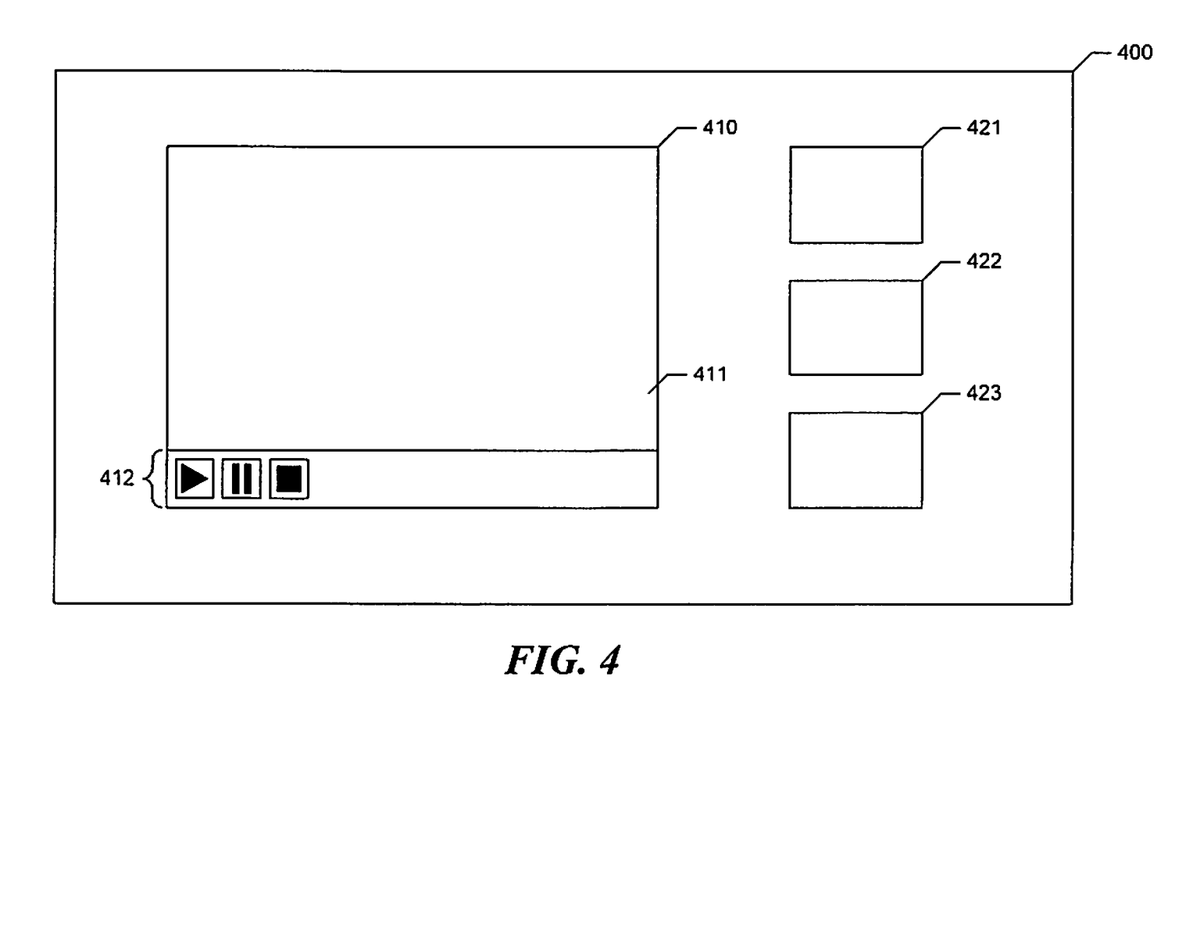
FIG. 4 is a display diagram showing sample contents of a display generated by the facility in which still images from selected advertising messages are displayed alongside the media sequence.

In some embodiments, the facility constructs the link in step 205 in such a way as to cause the client to display the media sequence with thumbnail still images for one or more selected advertising message alongside. FIG. 4 is a display diagram showing sample contents of a display generated by the facility in which still images from selected advertising messages are displayed alongside the media sequence. The diagram shows a page 400, such as a dynamically generated page, to which the link generated in step 205 points. The page includes an embedded media player 410, comprising a display pane 411 for displaying media sequences, as well as controls 412 for controlling the display of media sequences. When the page is loaded, the media sequence with which the link to the page is associated is played in the display pane 411 of the embedded media player. At the same time, advertising message thumbnails are displayed at thumbnail positions 421-423 near the embedded media player. The user can activate an advertising message thumbnail, such as by clicking it or hovering the mouse cursor over it. In response, the page displays the advertising message associated with the advertising message thumbnail. This advertising message may be displayed in a variety of locations, including in-place in its thumbnail position, in the embedded media player 410 in which the media sequence is displayed, or in a second embedded media player that is opened elsewhere in the page, such as in the portion of the page occupied by the thumbnail positions.

In step 206, if additional media sequences in the set remain to be processed, then the facility continues in step 204 to process the next media sequence in the set, else the facility continues in step 207. In step 207, the facility generates a query result containing the links generated in step 205. In step 208, the facility replies to the query received in step 201 with the query result generated in step 207. After step 208, the facility continues in step 201 to receive the next query.

Those skilled in the art will appreciate that the steps shown in FIG. 2 may be altered in a variety of ways. For example, the order of the steps may be rearranged; substeps may be performed in parallel; shown steps may be omitted, or other steps may be included; etc.

In some embodiments, rather than deploying an advertising message with a primary media sequence by its construction of a link to the primary media sequence that is included in the search result, the facility instead includes either the advertising message itself or a link to the advertising message within a version of the primary media sequence that is served to the user who receives the search result. In these embodiments, where the user saves a copy of the served media sequence, the advertising message can be presented to the user each time the user plays the saved media sequence.

In some embodiments, rather than selecting an advertising message to deploy with a primary media sequence before generating the search result, the facility instead defers selection of an advertising message to deploy until after the user has selected the media sequence from the search result for retrieval. For example, the link to a media sequence included in the search result may include information usable by the facility to select an advertising message, such as search terms contained in the query. Table 5 below shows a link similar to the link of Table 2 in which the advertising message identifier parameter has been replaced with a parameter indicating the query string "general motors."

TABLE 5 http://sponsoredvideo.aol.com/play?contentid=2306022&query=general%20motors

Further, in some embodiments, the facility stores information inside the primary media sequence that causes a media player program playing the media sequence to call the facility for selection and deployment of an advertising message each time the media sequence is played. This "late-binding" of advertising messages can enable the facility to select even the most recently-introduced advertising messages. Indeed, it can cause advertising messages to be presented that are not available when the search result is generated, or even when the media sequence is served.

It will be appreciated by those skilled in the art that the above-described facility may be straightforwardly adapted or extended in various ways. For example, the facility may be used with media sequences and/or advertising messages of various media sequence types. Further, the facility may use a variety of mechanisms to attach advertising messages to media sequences. Additionally, the facility may attach advertising messages to media sequences made available in a variety of forms, such as streaming or downloaded forms. Also, the facility may be implemented in conjunction with a variety of other multimedia searching and/or advertising functionality. Further, the facility may be used by various combinations of parties, including advertisers, advertising agencies, electronic publishers, intermediaries of various types, etc. Advertising revenue may be collected from various combinations of these parties, and distributed to various combinations of these parties. While the foregoing description makes reference to preferred embodiments, the scope of the invention is defined solely by the claims that follow and the elements recited therein.

We claim:

1. A computer-implemented method for providing media content to users over an electronic network, the method comprising the following operations performed by at least one processor:
    receiving, over the electronic network, a user input comprising a query from a user device;
    identifying media content and a plurality of advertising messages based on received query of the user input;
    accessing metadata associated with identified media content to determine a content type of the identified media content;
    accessing a relational database that indexes an identifier of each of the plurality of advertising messages to at least one content type;
    for each of the identified plurality of advertising messages, determining whether the advertising message is of a content type that is compatible with the content type determined for the identified media content;
    selecting at least one of the plurality of advertising messages determined to have a content type that is compatible with the identified content type of the media content;
    generating an encrypted link, comprising concatenated identifiers of the identified media content and the selected one of the plurality of advertising messages; and
    attaching the selected advertising message to the media content such that the selected advertising message is presented at the user device in at least one position relative to the media content once the encrypted link is selected.

2. The method of claim 1, wherein the first content type is audio, the second content type is video, and the third content type is audio plus video.

3. The method of claim 1, further comprising causing the media content to be presented at the user device in conjunction with the attached advertising message.

4. The method of claim 3, further comprising generating a link that causes the attached advertising message to be presented in conjunction with the media content.

5. The method of claim 4, wherein the generated link comprises a uniform resource locator.

6. The method of claim 5, wherein the uniform resource locator includes a first indicator of the media content and a second indicator of the attached advertising message.

7. The method of claim 6, wherein the first indicator comprises a first uniform resource locator and the second indicator comprises a second uniform resource locator.

8. The method of claim 6, wherein the first indicator comprises a first numerical identifier that maps to a corresponding first uniform resource locator and the second indicator comprises a second numerical identifier that maps to a corresponding second uniform resource locator.

9. The method of claim 6, further comprising encrypting the first indicator and the second indicator such that they can be decrypted using a key.

10. The method of claim 4, wherein the generated link references a custom metafile containing a first indicator of the media content and a second indicator of the attached advertising message.

11. The method of claim 1, wherein the at least one position comprises before the media content, after the media content, during the media content, or throughout the media content.

12. A system for providing media content to users over an electronic network, the system comprising:
    at least one processor; and
    at least one memory device that stores instructions that cause the at least one processor to perform operations comprising:
    receiving, over the electronic network, a user input from a user device;
    identifying media content and a plurality of advertising messages based on received query of the user input;
    accessing metadata associated with identified media content to determine a content type of the identified media content;
    accessing a relational database that indexes an identifier of each of the plurality of advertising messages to at least one content type;
    for each of the identified plurality of advertising messages, determining whether the advertising message is of a content type that is compatible with the content type determined for the identified media content;
    selecting at least one of the plurality of advertising messages that is determined to have a content type that is compatible with the identified content type of the media content;
    generating an encrypted link, comprising concatenated identifiers of the identified media content and the selected one of the plurality of advertising messages; and attaching the selected advertising message to the media content such that the selected advertising message is presented at the user device in at least one position relative to the media content once the encrypted link is selected.

13. The system of claim 12, wherein the operations further comprise causing the media content to be presented at the user device in conjunction with the attached advertising message.

14. The system of claim 13, wherein the operations further comprise generating a link that causes the attached advertising message to be presented in conjunction with the media content.

15. The system of claim 14, wherein the generated link comprises a uniform resource locator.

16. The system of claim 15, wherein the uniform resource locator includes a first indicator of the media content and a second indicator of the attached advertising message.

17. The system of claim 16, wherein the first indicator comprises a first uniform resource locator and the second indicator comprises a second uniform resource locator.

18. The system of claim 16, wherein the first indicator comprises a first numerical identifier that maps to a corresponding first uniform resource locator and the second indicator comprises a second numerical identifier that maps to a corresponding second uniform resource locator.

19. The system of claim 16, wherein the operations further comprise encrypting the first indicator and the second indicator such that they can be decrypted using a key.

20. A tangible, non-transitory computer-readable medium storing instructions that, when executed by at least one processor, cause the at least one processor to perform operations comprising:
receiving, over the electronic network, a user input comprising a query from a user device;
identifying media content and a plurality of advertising messages based on received query of the user input;
accessing metadata associated with identified media content to determine a content type of the identified media content;
accessing a relational database that indexes an identifier of each of the plurality of advertising messages to at least one content type;
for each of the identified plurality of advertising messages, determining whether the advertising message is of a content type that is compatible with the content type determined for the identified media content;
selecting at least one of the plurality of advertising messages determined to be of a content type that is compatible with the identified content type of the media content;
generating an encrypted link, comprising concatenated identifiers of the identified media content and the selected one of the plurality of advertising messages; and
attaching the selected advertising message to the media content such that the selected advertising message is presented at the user device in at least one position relative to the media content once the encrypted link is selected.

* * * * *